Feb. 6, 1962 A. MAZEIKA 3,019,657
PRESSURE GAUGES
Filed Jan. 15, 1957

INVENTOR.
ALBERT MAZEIKA
BY
Threedy & Threedy
HIS ATTORNEYS.

United States Patent Office 3,019,657
Patented Feb. 6, 1962

3,019,657
PRESSURE GAUGES
Albert Mazeika, Chicago, Ill., assignor to Milton Manufacturing Co., Inc., Chicago, Ill., a corporation of Illinois
Filed Jan. 15, 1957, Ser. No. 634,287
1 Claim. (Cl. 73—419)

My invention relates to pressure gauges and more particularly to a pressure gauge especially adaptable for determining the inflation pressure of pneumatic tires, life rafts, and many other similar articles subject to pneumatic expansion.

One of the several objects of this invention is to provide a pressure gauge of the character hereinafter described which is characterized by the inclusion in its structure of a volume chamber insertable in a barrel of the gauge between the piston thereof and the coupling which connects the barrel of the gauge to an air chuck head. Such arrangement accommodates larger air volume at lesser air pressure, resulting in a low pressure reading.

Another and equally important object of the invention is the provision of an air pressure gauge by means of which relatively low pressure readings may be obtained.

Yet another and equally important object of this invention is to accomplish a low pressure reading by an arrangement which is compact, simple in construction, and economical in manufacture.

Other objects will appear hereinafter.

The invention consists in the novel combination and arrangement of parts to be hereinafter described and claimed.

The invention will be best understood by reference to the accompanying drawings showing the preferred form of construction, and in which.

Figure 1:
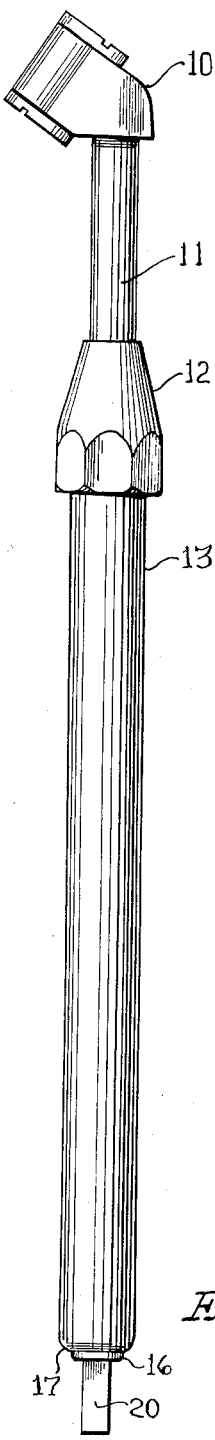
FIG. 1 is a side elevational view of an air pressure gauge embodying my invention.
Figure 2:
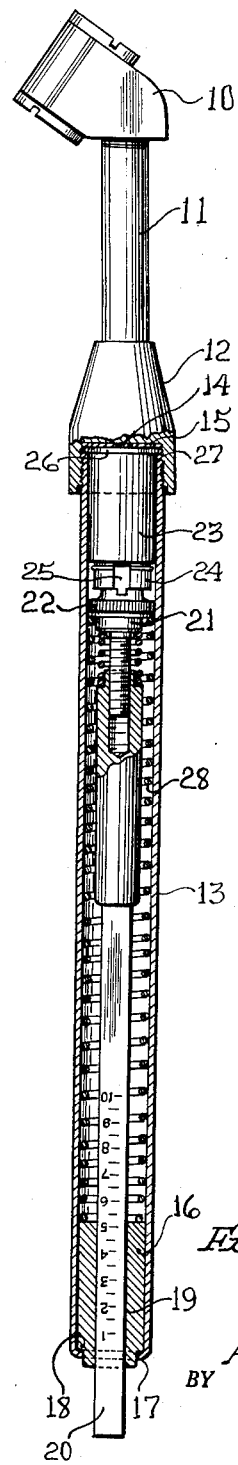
FIG. 2 is a part sectional detailed view of the same.
Figure 3:
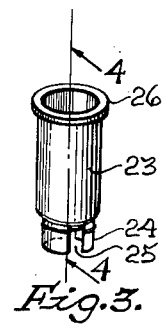
FIG. 3 is a perspective view of the volume chamber embodying my invention.
Figure 4:
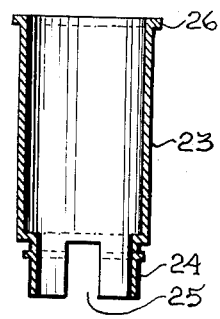
FIG. 4 is a sectional detailed view taken substantially on line 4—4 of FIG. 3.

I contemplate accomplishing the several objects of my invention by the preferred form of construction shown in the accompanying drawings in which drawings, 10 indicates an air chuck head, which may be of any preferred form of construction. This head is carried by an extension 11 having a longitudinal bore formed therein. This extension at its end opposite the head 10 is connected by a coupling 12 to one end of a tube or barrel 13. The coupling 12 has a longitudinal bore formed therein in communication with the perforation 14 of a washer 15. Arranged in the barrel 13 at the end opposite of its connection with the coupling 12 is a sleeve 16 held from projection outwardly in one direction of the barrel by means of a flange 17 engaging a shoulder 18. The sleeve has a bore 19 formed therein which is substantially square or rectangular in cross section. The sleeve provides a guide for a gauge bar or stick 20. The inner end portion of the gauge bar 20 carries a piston 21 including a sealing washer 22. This piston may be constructed substantially in accordance with my pending application Sr. No. 611,618, now Patent No. 2,865,695.

Interposed between the piston 21 and the washer 15 is a cylindrical volume chamber 23 of an outside diameter slightly less than the inside diameter of the barrel 13 into which it is inserted. The volume chamber 23 has a reduced neck portion 24 which is provided with longitudinal slots 25 on opposite sides thereof for the passage of air from within the chamber 23. Opposite the reduced neck portion 24 of the chamber 23, is a lateral flange 26 which engages the end 27 of the barrel 13 whereby when the coupling 12 is threaded upon the barrel 13 the volume chamber will be rigidily positioned between the washer 15 and the end of the barrel 13. Arranged between the piston 21 and the sleeve 16 is a compression spring 28 which spring 28 resists the outward projection of the bar 20 under pneumatic pressure.

The function of the volume chamber 23 is to increase the area between the piston 21 and the washer 15 as the air is admitted into the volume chamber 23, the resulting pressure which will be exerted on the piston 21 increases gradually as the volume of air in the volume chamber increases. Thus the piston 21 together with its gauge bar 20 will commence to be expelled from the barrel 13 gradually and will be responsive initially to low pressure in the volume chamber. The pressure in the volume chamber will increase as the volume of air increases within the chamber. Thus the volume chamber 23 permits a more gradual increase of exerting pressure on the piston 21 and therefore permits a more accurate low pressure reading.

In my improved air gauge, I have incorporated therein the volume chamber 23. The use of this chamber accommodates a large air volume at a lesser pressure with the result that a relatively low pressure reading is obtainable. Such an arrangement results in a relatively small tube which makes it easy to handle as well as to manufacture at an economical cost.

An air pressure gauge constructed in accordance with the foregoing description will have many uses and is especially useful where it is required to obtain a low pressure reading of the air pressure of pneumatic tires of air craft or the like, life rafts, and many other pneumatic expanding bodies.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

An improvement in an air pressure gauge for obtaining a low pressure reading in which the gauge includes a movable piston carried by a gauge bar and a tube within which said piston operates, a coupling connecting the tube to an air chuck, the improvement comprising a member having a cylindrical body open at both ends and having an outside diameter slightly less than the inside diameter of the tube, said member adapted to be inserted in one end of said tube between said piston and said coupling so as to provide said tube at one end with an enlarged volume chamber, and means provided by one end of said member for fixedly positioning said member within one end of said tube and between said piston and said coupling, said means comprising a lateral flange provided on one end of said member adapted to engage one end of said tube which is adapted to be disposed within said coupling.

References Cited in the file of this patent

UNITED STATES PATENTS

| | | |
|---|---|---|
| 1,079,965 | Waters | Dec. 2, 1913 |
| 1,894,648 | Wahl | Jan. 17, 1933 |
| 2,050,084 | Carliss | Aug. 4, 1936 |
| 2,078,148 | Longstreet | Apr. 20, 1937 |
| 2,096,328 | Iskyan | Oct. 19, 1937 |
| 2,686,445 | Keck | Aug. 17, 1954 |
| 2,778,225 | Schur | Jan. 22, 1957 |